Dec. 19, 1967     O. LINDSTRÖM     3,359,099
METHOD OF PRODUCING A POROUS ELECTRODE MATERIAL
Filed Feb. 16, 1965
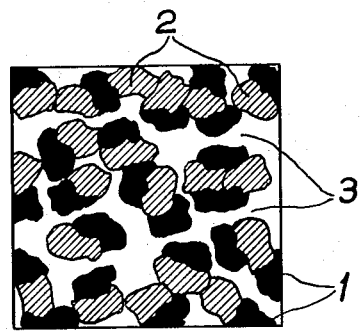
INVENTOR.
OLLE LINDSTRÖM
BY Bailey, Stephens & Huettig United States Patent Office 3,359,099
Patented Dec. 19, 1967

3,359,099
METHOD OF PRODUCING A POROUS
ELECTRODE MATERIAL
Olle Lindström, Vasteras, Sweden, assignor to Allmänna
Svenska Elektriska Aktiebolaget, Vasteras, Sweden, a
corporation of Sweden
Filed Feb. 16, 1965, Ser. No. 433,028
Claims priority, application Sweden, Feb. 21, 1964,
2,105/64
16 Claims. (Cl. 75—211)

Electrical energy may be generated, inter alia, by means of reaction between a continually supplied combustible substance such as, for example, hydrogen and a continually supplied oxidizing substance, such as, for example, oxygen, air or a halogen in a so-called fuel cell, which in its simplest form may consist of a suitable fluid electrolyte and two porous electrodes immersed in this, of which the one is arranged between the electrolyte and the combustible substance and the other between the electrolyte and the oxidizing substance.

The electrode reactions at the fuel cell occur in contact points between the electrolyte, combustible and oxidising substances respectively and the electrode. These contact points are situated at those places in the electrodes where the electrolyte and combustible and oxidising substances are adjacent to each other. The points in the electrodes which are active when the reaction occurs are therefore situated in the pore surfaces.

A porous electrode in a fuel cell does not need to form a separating wall between a gas chamber containing a gaseous substance such as a fuel, and an electrolyte chamber containing a liquid electrolyte. The combustible substance can also be dispersed or dissolved in the electrolyte, as is the case with cells for liquid fuel and then the electrolyte with its fuel occurs on both sides of the electrode as well as in its pores. Certain oxidants, for example hydrogen peroxide, may also be dissolved in the electrolyte used and then the conditions for the electrode on the oxidant side are analogous with those described for the electrode on the fuel side in fuel cells with liquid fuel.

In fuel cells it is known to use electrodes which are essentially formed of nickel and in which the areas nearest to the pore walls contain nickel in activated form. Outside the parts of the electrodes situated nearest to the pore walls, nickel in inactive form is present and its purpose there is to serve as a carrying material for the active areas situated nearest to the pore walls. Such an electrode can according to a known method be produced by using nickel powder and a powder consisting of an aluminium nickel alloy ("Raney-alloy"). A mixture of the powders is compressed together to an electrode, which is then sintered. After sintering the aluminium is dissolved out of the aluminium nickel alloy ("Raney-alloy") in the sintered product with an alkali. The area around the pores becomes active due to the large pore surface and the disturbed crystal lattice which the remaining material has after the dissolution of the aluminium. As previously intimated, the pure nickel powder serves after sintering as a carrying body for the electrode, while the material of the alloy remaining after the dissolution with alkali forms the active areas which surround the pores. As replacement for the pure nickel powder for the known electrode have been proposed carbon, iron and cobalt powder and as replacement for the said alloy, other alloys in which nickel can be replaced by cobalt or iron and the aluminium by silicon, magnesium or zinc. The electrodes can inter alia be used as fuel electrodes for hydrogen.

In addition a method has been proposed to produce porous electrodes by means of a sintering together of a mixture of particles of nickel and aluminium and a subsequent at least partial dissolution of the aluminium from the sintered product. The nickel powder in this product can be substituted by iron, cobalt, molybdenum, tungsten or silver powder and the aluminium powder by magnesium, zinc or silicon powder.

It has now been shown that it is possible to produce an electrode material which has substantial advantages over earlier known or proposed electrodes. The electrode material according to the present invention has thus a considerably greater service life. Moreover, it is an advantage with the invention that the very troublesome dissolution and activating processes need not be made on a ready-made and sintered product with reference to the special steps which are necessary as protection against damage to such a product.

The invention relates to a method of producing a porous electrode material, preferably for use in fuel cells which comprises a residue obtained from a product comprising at least one catalytically active metal with slight solubility in alkali and at least one alkali-soluble metal or metalloid, by dissolution of the alkali-soluble metal or metalloid, characterised in that, from a powder comprising particles of an alloy of the metal with slight solubility in alkali and of the alkali-soluble metal or metalloid, at least the main part of the alkali-soluble metal or metalloid is removed by means of treatment with alkali and in that the residue of the powder or a mixture of the residue of the powder and particles of the same or another metal or metalloid with slight solubility in alkali or of mixtures of these, while the residue of the powder or the mixture is protected from the influence of oxygen of the air, by means of pressing or the like, is shaped to a coherent electrode body which is eventually subjected to a subsequent sintering to improve the cohesion of the shaped electrode body.

The said alloy constitutes a so-called Raney-alloy. After the dissolution of the alkali-soluble constituent a so-called Raney metal is produced.

The metal with slight solubility in alkali in the alloy can inter alia consist of one or several of the substances nickel, cobalt, iron, molybdenum, tungsten or silver. The alkali soluble metal or metalloid in the alloy can consist of for example aluminum, magnesium, zinc, silicon or mixtures of these. The metal or metalloid with slight solubility in alkali which besides the said residue of the alloy powder is used in the mixture for the formation of the electrode material and which is present in inactive form, can consist of nickel, cobalt, iron, molybdenum, tungsten, silver, carbon or mixtures of these substances.

The powder remaining after the treatment of the alloy with alkali can be protected against the influence of the oxygen of the air in different ways. One way is that the powder is kept in a protective atmosphere, for example in nitrogen or another inert gas and that the shaping of the electrode material and the possible sintering is carried out in protective atmosphere. Another way is that the powder residue is subjected to a heat treatment so that it is made inactive. If the powder residue consists of for example an active nickel, the heat treatment can be carried out at a temperature of preferably about 100–500° C. for a time of preferably about ½–24 hours. A third way is that the powder residue is subjected to a treatment with an inert gas, for example carbon dioxide, methane, ammonia, having the possibility of being adsorbed at the surfaces of the particles in the powder residue and thereby at least temporarily inactivating the material. Both the last mentioned ways of protecting the powder from the influence of the oxygen in the air have the special advantage that the shaping can be carried out at normal room atmosphere.

By so-called heat pressing, possibly in a protective gas atmosphere at 150–400° C., a separate sintering process can be eliminated. By the heat pressing a sufficient binding between the Raney-metal particles and other possible components is established. Electrodes which are manufactured in this way and not subjected to any subsequent sintering or other heat treatment are, however, sometimes reactive to oxygen in the air. It is therefore suitable in these cases that the electrode after the pressing is kept at a higher temperature, 100–400° C. for ½–24 hours in order to eliminate its pyrophoric properties.

In the Raney-alloy the proportion of the metal with slight solubility in alkali is normally 10–90, often 50 percent by weight and thus the proportion of the alkali-soluble metal is 90–10 often 50, percent by weight.

Even if it is possible to produce the electrode material of pure Raney-metal, it is for several reasons, inter alia economic reasons and structural strength reasons, advantageous to use greater proportions of the inactive metal or metalloid with slight solubility in alkali in the powder mixture, of which the electrode material is shaped. It is suitable that the proportion in Raney-metal constitutes 1–90, preferably 3–50, percent by weight of the total weight of Raney-metal and inactive metal or metalloid.

The particle size of the particle materials can be varied within wide limits, depending on the actual fuel and the electrode type. The size of the pores in a manufactured electrode is determined to a high degree by the size of the particles used. In most cases it is desirable that all pores are the same size, which is achieved by the use of well demarcated powder fractions. In many cases it is suitable to use powder fractions with an average particle size of 1–50$\mu$ for the Raney-alloy and powder fractions with an average particle size of 1–100$\mu$ for the inactive component with slight solubility in alkali. With the use of Raney-nickel alloys and nickel as the inactive material respectively, it has been found specially advantageous to use powder fractions with an average particle size of 5–30$\mu$ for the Raney-nickel alloy and powder fractions with an average particle size below 10$\mu$ for the inactive nickel. In order to increase the porosity of the electrode there may be added to the mixture of the particles up to around 25 percent by weight of an expanding agent, for example ammonium carbonate or ammonium bicarbonate having the capacity to dissociate in gaseous products during the sintering process.

The sintering of the Raney-metal and the mixture of Raney-metal and inactive metal respectively can in most cases be carried out at a temperature of 450–1000° C. It is suitable to use a temperature of 500–800° C. specially when nickel is used as Raney-metal and as inactive metal.

The invention will be clarified more closely in connection with the description of a number of embodiment examples.

The figure shows considerably enlarged a cut through a part of an electrode body produced according to the invention.

Example 1

Aluminum-nickel alloy containing 50 percent by weight of each of the components and with an average particle size of 20 m$\mu$ is treated with a water solution containing 30 percent by weight of potassium hydroxide at about 40° C. for 12 hours. After this powder residue is washed once with a water solution containing 30 percent by weight potassium hydroxide and three times with distilled water. The powder is then dried in vacuum at 70° C. for two days. The powder residue is made inactive by means of treatment with carbon dioxide at 70° C. for four days. After this treatment the powder is not pyrophoric and can be handled in air.

20 parts by weight of this powder residue are mixed with 80 parts by weight of carbonyl nickel powder with an average particle size of approximately 5 m$\mu$. The mixture is pressed at room atmosphere into electrodes with a diameter of 35 mm. and a thickness of 2 mm. with a pressure of 1500 kp./cm.$^2$. the electrodes are sintered for 30 minutes in hydrogen atmosphere at a temperature of 550° C. The electrodes may be used directly as fuel cell electrodes for, for example, hydrogen.

In the figure the particles of the residue are denoted 1, the carbonyl nickel particles 2 and the pores formed 3.

Example 2

Raney-nickel is produced in the way shown in Example 1, but is made inactive instead by means of a heat treatment in nitrogen at 250° C. for one hour.

An electrode is then produced in the way described in Example 1, but with 10 parts by weight of the powder residue being mixed with 90 parts by weight of the carbonyl nickel powder.

Example 3

Raney-nickel is produced in the way described in Example 1, without being made inactive. The Raney-nickel powder is instead kept in nitrogen as protective gas.

40 parts by weight of the powder residue are mixed with 60 parts by weight of carbonyl nickel powder with an average particle size of 5 m$\mu$. The mixture is heat pressed to form electrodes with a diameter of 35 mm. and a thickness of 2 mm. with a pressure of 1500 kp./cm.$^2$ at 350° C. The electrodes are then subjected to a further heat treatment at 350° C. for 12 hours. The whole procedure with mixing, pressing and subsequent heat treatment is carried out in nitrogen as protective gas. After the heat treatment the electrodes can be stored in open air and can be used as fuel cell electrodes for, for example, hydrogen.

Example 4

Raney-iron is produced and made inactive in the way described in Example 1 from a powder of an alloy with an average particle size of 10 m$\mu$ and in which the alloy consists of 60 percent by weight iron and 40 percent by weight aluminium.

An electrode is then produced in the way described in Example 1 from 10 parts by weight of the powder residue and 90 parts by weight carbonyl iron powder with an average particle size of 5 m$\mu$. Sintering takes place at 700° C.

Example 5

Raney-silver is produced and made inactive in the way described in Example 1 from a powder of an alloy with an average particles size of 50 m$\mu$ and in which the alloy consists of 50 percent by weight silver and 50 percent by weight aluminium.

An electrode is produced in the way described in Example 1 from 20 parts by weight of the powder residue and 80 parts by weight carbonyl nickel powder with an average particle size of 30 m$\mu$. The sintering takes place at a temperature of 550° C. The electrode can be used as an oxygen electrode.

Example 6

Raney-nickel is produced and made inactive as shown in Example 1 from a powder of an alloy with an average particle size of 2 m$\mu$ and in which the powder consists of 70 percent by weight nickel and 30 percent by weight silicon.

An electrode is produced in the way described in Example 1 from 5 parts by weight of the powder residue and 95 parts by weight carbonyl nickel powder with an average particle size of 20 m$\mu$. The sintering takes place at a temperature of 600° C.

Example 7

Raney-molybdenum is produced and made inactive in the way described in Example 1 from a powder of an alloy with an average particle size of 10 m$\mu$ and in which the alloy consists of 70 percent by weight molybdenum and 30 percent by weight zinc.

An electrode is then produced in the way given in Example 1 from 30 parts by weight of the powder residue and 70 parts by weight carbonyl molybdenum powder with an average grain size of 5 m$\mu$. The sintering takes place at 800° C.

The electrodes described may be used in fuel cells with different electrolytes, such as for example potassium or sodium hydroxide solutions. The electrode material cannot only be formed as plates, but also inter alia as pellets, grains or the like. Such electrode material in pellet or grain form can be used inter alia in fuel cells with liquid fuel, for example spirit or hydrazine dissolved in the electrolyte, whereby for example it can be arranged in a container manufactured of a net or perforated sheet material. The electrode material can also be used in fuel cells of the type where the electrolyte consists of an ion exchange membrane of organic or inorganic type.

The electrodes which have been described may with advantage be used not only in fuel cells but also in other types of arrangements where electrode reactions with hydrogen as participant part is used for generating electrical energy, for example in accumulators.

I claim:

1. In the manufacture of a fuel cell having electrodes in contact with an electrolyte, the steps of treating a powder with an alkali to remove at least the main part of an alkali soluble element in said powder, said powder comprising an alloy comprising at least one catalytically active metal with slight solubility in alkali and at least one alkali-soluble solid element having the property of activating the catalytically active metal forming a coherent electrode body from the particulate material comprising the residue of the powder and sintering while protecting the residue of the powder from the influence of oxygen of the air.

2. Method as claimed in claim 1, in which the residue of the powder is protected from the influence of the oxygen of the air by keeping the residue of the powder in a protective atmosphere after the treatment with alkali and forming the particulate material to a coherent electrode body in a protective atmosphere.

3. Method as claimed in claim 1 in which the residue of the powder is protected from the influence of the oxygen of the air by subjecting the residue of the powder to a heat treatment for non-activating it before the forming of the particulate material to a coherent electrode body.

4. Method as claimed in claim 1, in which the residue of the powder is protected against the influence of oxygen of the air by subjecting the residue of the powder to a treatment with an inert gas having the capability of being adsorbed at the surfaces of the particles in the residue of the powder.

5. Method as claimed in claim 1, subjecting the coherent electrode body to a heat treatment to eliminate pyrophoric properties at a temperature below the temperature required for sintering.

6. Method as claimed in claim 1, in which the catalytically active metal having slight solubility in alkali is selected from the group consisting of nickel, cobalt, molybdenum, iron, silver and mixtures thereof and the alkali-soluble solid element is selected from the group consisting of aluminium, magnesium, zinc, silicon and mixtures thereof.

7. Method as claimed in claim 1, in which the catalytically active metal having slight solubility in alkali is nickel and the alkali-soluble solid element is aluminium.

8. In the manufacture of a fuel cell having electrodes in contact with an electrolyte, the steps of treating a powder with an alkali to remove at least the main part of an alkali soluble element in said powder, said powder comprising an alloy comprising at least one catalytically active metal with slight solubility in alkali and at least one alkali-soluble solid element having the property of activating the catalytically active metal forming a coherent electrode body from a mixture comprising a first particulate component in the form of the residue of the powder and a second particulate component comprising at least one solid element with slight solubility in alkali and sintering while protecting the residue of the powder from the influence of the oxygen of the air.

9. Method as claimed in claim 8, in which the residue of the powder is protected from the influence of the oxygen of the air by keeping the residue of the powder in a protective atmosphere after the treatment with alkali and forming the particulate material to a coherent electrode body in a protective atmosphere.

10. Method as claimed in claim 8, in which the residue of the powder is protected from the influence of the oxygen of the air by subjecting the residue of the powder to a heat treatment for nonactivating it before the forming of the particulate material to a coherent electrode body.

11. Method as claimed in claim 8, in which the residue of the powder is protected against the influence of oxygen of the air by subjecting the residue of the powder to a treatment with an inert gas having the capability of being adsorbed at the surfaces of the particles in the residue of the powder.

12. Method as claimed in claim 8, subjecting the coherent electrode body to a heat treatment to eliminate pyrophoric properties at a temperature below the temperature required for sintering.

13. Method as claimed in claim 8, in which the catalytically active metal having slight solubility in alkali is selected from the group consisting of nickel, cobalt, molybdenum, iron, silver and mixtures thereof and the alkali-soluble solid element is selected from the group consisting of aluminium, magnesium, zinc, silicon and mixtures thereof.

14. Method as claimed in claim 8, in which the catalytically active metal having slight solubility in alkali is nickel and the alkali-soluble solid element is aluminium.

15. Method as claimed in claim 8, in which the catalytically active metal having slight solubility in alkali is selected from the group consisting of nickel, cobalt, molybdenum, iron, silver and mixtures thereof, the alkali-soluble solid element from the group consisting of aluminium, magnesium, zinc, silicon and mixtures thereof and the solid element having slight solubility in alkali is selected from the group consisting of nickel, cobalt, molybdenum, iron, silver, carbon and mixtures thereof.

16. Method as claimed in claim 8, in which the proportion of the residue of the powder in the mixture of the first particulate component and the second particulate component is 1–90 percent by weight of the total weight of the mixture.

References Cited

UNITED STATES PATENTS

| 2,977,327 | 9/1958 | Raney | 252—472 |
| 3,111,396 | 11/1963 | Ball | 75—222 |
| 3,139,408 | 6/1964 | Tumer | 252—472 |
| 3,170,785 | 2/1965 | Phillips | 148—126 |

FOREIGN PATENTS

| 514,229 | 6/1955 | Canada. |
| 670,140 | 9/1963 | Canada. |
| 628,407 | 8/1949 | Great Britain. |

CARL D. QUARFORTH, *Primary Examiner.*

BENJAMIN R. PADGETT, *Examiner.*

A. J. STEINER, *Assistant Examiner.*